United States Patent
Hayutin (10) Patent No.: US 7,840,851 B2
(45) Date of Patent: Nov. 23, 2010

(54) ANNOTATING GUI TEST AUTOMATION PLAYBACK AND DEBUGGING

(75) Inventor: Wesley D. Hayutin, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 358 days.

(21) Appl. No.: 12/031,979

(22) Filed: Feb. 15, 2008

(65) Prior Publication Data
US 2009/0210749 A1 Aug. 20, 2009

(51) Int. Cl.
G06F 11/00 (2006.01)

(52) U.S. Cl. .................................................. 714/46
(58) Field of Classification Search ................... 714/46, 714/57
See application file for complete search history.

(56) References Cited

U.S. PATENT DOCUMENTS

| | | | | |
|---|---|---|---|---|
| 5,596,714 A | * | 1/1997 | Connell | 714/38 |
| 5,781,720 A | * | 7/1998 | Parker et al. | 714/38 |
| 5,926,638 A | * | 7/1999 | Inoue | 717/125 |
| 6,961,873 B2 | * | 11/2005 | Dubovsky | 714/38 |
| 7,574,625 B2 | * | 8/2009 | McGlinchey et al. | 714/38 |
| 2009/0133000 A1 | * | 5/2009 | Sweis et al. | 717/124 |

OTHER PUBLICATIONS

Michaelis, Mark, "A Unit Testing Walkthrough w/Visual Studio Team Test", Microsoft Visual Studio 2005 Developer Center, Visual Studio 2005 Tech. Articles, Mar. 2005, pp. 1-13.

Palermo, Jeffrey, "Guidelines for Test-Driven Development", Microsoft Visual Studio 2005 Technical Articles, May 2006, pp. 1-3.
Michaelis, Mark "Introducing Microsoft Visual Studio 2005 Team System Web Testing", Microsoft Visual Studio 2005 Technical Articles, Sep. 2005, pp. 1-15.
Microsoft Corp., "Microsoft Visual Studio Team Edition for Software Testers", Microsoft Visual Studio 2005 Technical Articles, Oct. 2005, pp. 1-6.
Potts, Rick, "Monitoring and Analyzing a Load Test Result", Microsoft Visual Studio 2005 Technical Articles, Sep. 2006, pp. 1-20.
Dockendorf, Scott, "Unit Testing & Generating Source Code for Unit Test Frameworks Using Visual Studio 2005 Team System", Microsoft Visual Studio 2005 Technical Articles, Sep. 2005, pp. 1-13.
Charles, Josh, "Web Test Authoring and Debugging Techniques", Microsoft Visual Studio 2005 Technical Articles, Dec. 2005, pp. 1-12.

(Continued)

Primary Examiner—Bryce P Bonzo
(74) Attorney, Agent, or Firm—Blakely, Sokoloff, Taylor & Zafman LLP (57) ABSTRACT

A method and system for annotating an object on the graphical user interface (GUI) ("a GUI object") during automated testing of an application. In one embodiment, the GUI of an application is tested with a test automation tool. During runtime of the automated test, the test automation tool automatically overlays a visual cue on the GUI. The visual cue points to a GUI object of the application and contains a comment regarding an event relating to the GUI object that is expected to occur in runtime.

17 Claims, 6 Drawing Sheets

OTHER PUBLICATIONS

Borland Software Corporation, "Getting Started: A Tutorial, SilkTest® 2006 Release 2", Jan. 2007, pp. 91-120.
Hewlett-Packard Development Company, L.P., "Tutorial, HP LoadRunner for the Windows operating systems, Software Version: 9.10", Jan. 2008, pp. 27-52.
Rational Software Corporation, "Rational® Robot, User's Guide, Version: 2002.05.00, Part No. 800-025137-000", 1998-2001, pp. 2-1 through 4-27.
"Rational Manual Tester, Creating a New Manual Test Script", IBM Corporation, 2004, 2005, http://publib.boulder.ibm.com/infocenter/rtnlhelp/v6r0m0/topic/com.ibm.rational.test.mt.doc/topics/t_creatinganewmt.html, 4 pages.
"Rational Manual Tester, Renaming Statement Labels in the Outline View", IBM Corporation, 2004, 2005, http://publib.boulder.ibm.com/infocenter/rtnlhelp/v6r0m0/topic/com.ibm.rational.test.mt.doc/topics/t_renamestatelabels.html, 5 pages.
"Rational Manual Tester, Attaching a File to a Statement", IBM Corporation, 2004, 2005, http://publib.boulder.ibm.com/infocenter/rtnlhelp/v6r0m0/topic/com.ibm.rational.test.mt.doc/topics/t_attachfiletostmt.html, 4 pages.
"Rational Performance Tester, Creating an empty test", IBM Corporation, 2005, http://publib.boulder.ibm.com/infocenter/rtnlhelp/v6r0m0/topic/com.ibm.rational.test.lt.doc/topics/create/tcreateempty.html, 2 pages.
"Rational Performance Tester, Generating a new test from a recorded session", IBM Corporation, 2005, http://publib.boulder.ibm.com/infocenter/rtnlhelp/v6r0m0/topic/com.ibm.rational.test.lt.doc/topics/create/tregen.html, 1 page.
"Rational Performance Tester, Specifying the expected content", IBM Corporation, 2005, http://publib.boulder.ibm.com/infocenter/rtnlhelp/v6r0m0/topic/com.ibm.rational.test.lt.doc/topics/edit/tcontentvpd.html, 3 pages.
"Rational Functional Tester, Recording a Script", IBM Corporation, 2002, 2004, http://publib.boulder.ibm.com/infocenter/rtnlhelp/v6r0m0/topic/com.rational.test.ft.help/RecordingScript.htm, 2 pages.
"Rational Functional Tester, Creating a New Functional Test Script without Recording", IBM Corporation, 2002, 2004, http://publib.boulder.ibm.com/infocenter/rtnlhelp/v6r0m0/topic/com.rational.test.ft.help/CreatingaNewRobotJScriptwithoutRecording.htm, 2 pages.
"Rational Functional Tester, Running a Script from Functional Test", IBM Corporation, 2002, 2004, http://publib.boulder.ibm.com/infocenter/rtnlhelp/v6r0m0/topic/com.rational.test.ft.help/PlayingBackTSfromRobotJ.htm, 2 pages.

* cited by examiner

ANNOTATING GUI TEST AUTOMATION PLAYBACK AND DEBUGGING

TECHNICAL FIELD

Embodiments of the present invention relate to a computer test automation tool, and more specifically, to a computer test automation tool that automatically tests an application's graphical user interface (GUI) and annotates the test on the GUI.

BACKGROUND

A graphical user interface (GUT) of an application, e.g., a Web application, can be complicated to test and debug. A GUI test tool can be used to automate the test of an application's GUI by performing various types of functional, load, or translation testing. For example, a GUI test tool can automatically fill in the address of an email recipient and run the email program to see whether the email can be delivered successfully. Thus, a test engineer can sit back and monitor the test without having to manually perform the test procedures.

A conventional GUI test tool uses various techniques to inform the user of the details of the test. For example, a live playback of an application can be shown on the display in real time while a test tool is driving the application. A test tool can also log its activities in a log file. Further, a test tool can take screenshots and screencasts of a test run, which can be reviewed by a user at a later time to determine the success or failure of the test. Additionally, a test tool can conditionally test the logic contained in the application.

The conventional techniques allow quality assurance engineers to determine the outcome of the tests in a complex and time-consuming manner. A test engineer can spend considerable resources to find out what failed, when the root cause occurred, and how and why the failure occurred. The test engineer conducting a test is generally not the same person who creates the test automation tool, and, therefore, may lack the expertise to successfully debug the applications. Further, in a regression test where a test automation tool is used to test an upgraded version of an application, details of older versions of the application may be forgotten or lost. Therefore, knowledge of the legacy of the application may not have been properly passed down to the persons who work with the upgraded version.

Therefore, there is a need to provide detailed information about an application's GUI in an informative and user-friendly manner, such that debugging efficiency can be improved.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and system for annotating an object on the graphical user interface (GUI) ("a GUI object") during automated testing of an application. In one embodiment, a test automation tool is used to test or debug an application, such as a Web application, a mail application, or any application that uses a GUI to interact with a user. In operation, the test automation tool automatically runs ("playbacks") the application according to a predetermined test scenario. At the same time, visual and/or audio information regarding the test are presented to a user who is monitoring the test. The visual/audio information includes comments of an author of the test automation tool regarding what should and should not occur during a test run. The information also informs a user of the events that are expected to happen in a successful test run. The information is very helpful to less experienced engineers who may be unsure of what the intended behavior of the automation or the application should be. The information is also very useful when the test automation is executed in a debugging mode. Debugging mode allows a user to step through a test procedure and to take advantage of the author's notes and comments.

The test automation tool described herein can overlay the application's GUI at runtime with the author's comments, pointers and visual cues. The comments, pointers and visual cues are placed, programmatically, on the application's GUI by the test automation tool at runtime. In one embodiment, the programming code that implements the test automation tool includes instructions that identify a GUI object, determine the location of the comments, pointers and visual cues relative to the location of the GUI object, and place the comments, pointers and visual cues in the determined locations on the GUI. Audio sound clips may also be used to add a comment with respect to the GUI object during live playbacks of a test run. Both the visual cues and audio sound clips can provide a user with information regarding what should happen versus what is actually happening during a test run. The information simplifies the process of understanding and debugging software automation execution.

One feature of the technique described herein is that both the visual and the audio information are presented to a user in an annotation overlay, which has a pointer (e.g., an arrow) pointing to a GUI object on the GUI. This feature allows the user to know the particular object to which a comment refers, and to gain a clear understanding of the context in which a comment arises. When an audio sound clip is automatically played during a test run, an annotation overlay containing a path to the corresponding audio file may be shown on the GUI, with a pointer pointing to the GUI object. The integration of visual and audio information during a test playback provides a user with insights into the execution of an application, which otherwise may not be apparent.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "testing", "overlaying", "incorporating", "displaying", "playing", "identifying", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
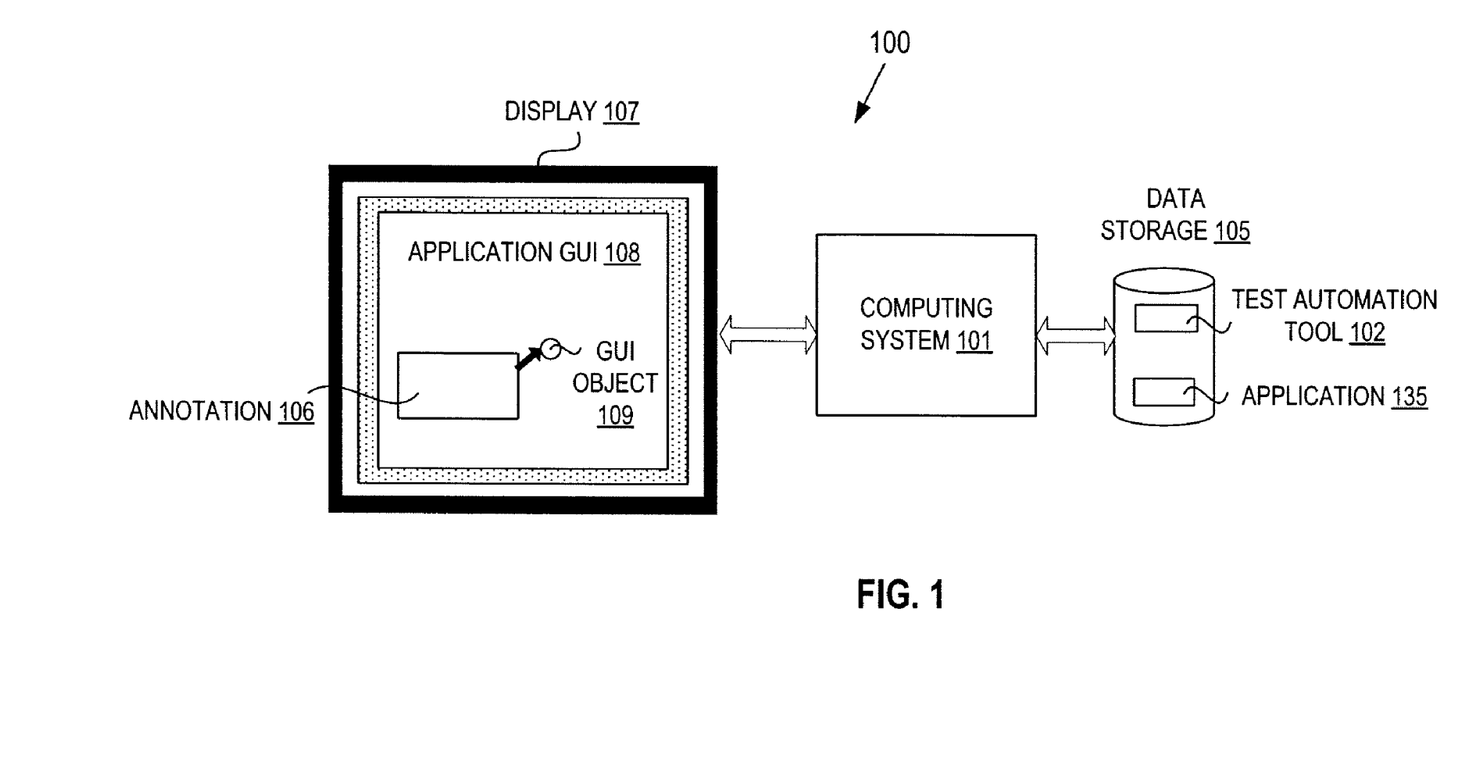
FIG. 1 illustrates a computing architecture in which embodiments of the present invention may be implemented.

FIG. 1 illustrates an exemplary architecture 100 in which embodiments of the present invention may operate. The architecture 100 includes a computing system 101 coupled to a display 107 and data storage 105. The computing system 101 may be, for example, a server, a personal computer (PC), a mobile phone, a palm-sized computing device, a personal digital assistant (PDA), and the like. Each of the display 107 and the data storage 105 may be locally coupled to the computing system 101 via wires and cables, or remotely coupled via a network, such as a public network (e.g., Internet), a private network (e.g., an Ethernet, a Local Area Network (LAN), or a corporate intranet), or a combination of both.

In one embodiment, the computing system 101 executes an application 135 to offer a service to a user, e.g., a Web service, a mail service, or the like. The application 135 has a GUI that can be displayed on the display 107 at runtime for receiving and displaying information to a user. In an example where the computing system 101 is a Web server hosting a Web site, the application 135 may include a Web page that can be remotely rendered by a browser that is resident on a user's terminal.

To test the GUI of the application 135, a user of the computing system 101 may execute a test automation tool 102 that can drive the application 135 automatically to detect anomalies during execution. Thus, a test engineer can sit back to monitor a test run without having to manually type in all of the necessary parameters. The test automation tool 102 may run a number of predetermined test scenarios on the application 135 to determine whether the application's GUI is functioning properly. The test automation tool 102 may also be used to debug the application 135 after a malfunction is detected. To keep a user of the test automation tool 102 informed of events that are supposed to happen during the execution of the application 135, one or more annotations 106 commenting on details of the test will pop up on the display 107. The annotations 106 may include visual cues, audio sound clips, or a combination of both. A pointer may associate the annotations 106 with a GUI object 109 that is being annotated. The annotations 106 will be described in greater detail with reference to FIGS. 2-4.

In the embodiment shown in FIG. 1, the test automation tool 102 and the application 135 are stored in data storage 105. The data storage 105 may comprise mass storage devices, such as magnetic or optical storage based disks or tapes. One or both of the test automation tool 102 and the application 135 may also be stored in internal memory or caches of the computing system 101.

Figure 2:
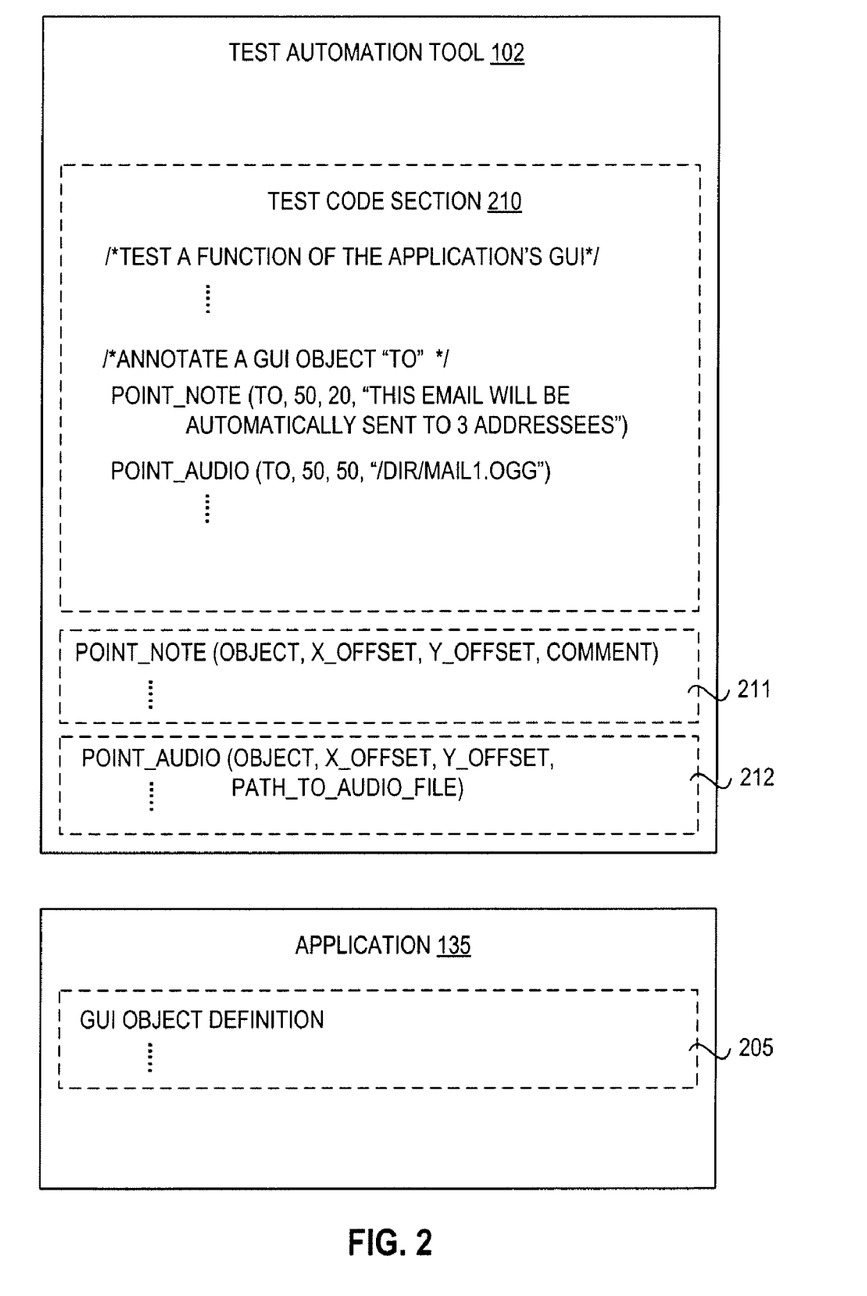
FIG. 2 illustrates an example of a test automation tool for automating the test of an application's graphical user interface (GULI).

FIG. 2 illustrates an embodiment of the test automation tool 102. In this embodiment, the test automation tool 102 is implemented by software that includes instructions executable by the computing system 101 of FIG. 1. The test automation tool 102 includes a test code section 210 to automatically test the functionalities of the GUI of application 135. The functionalities under test includes whether the application 135 correctly uses its GUI objects to achieve correct results. The GUI objects include text boxes, buttons, links (e.g., HyperText Markup Language (HTML) links), and the like. The GUI objects are defined in a GUI object definition 205 of the application 135. The GUI object definition 205 includes information and characteristics of the GUI objects, such as the name of the object, an identifier number of the object, a display location of the object on the GUI, and the like. The GUI object definition 205 can be referenced by the test automation tool 102 at runtime to determine the placement of an annotation.

The test automation tool 102 further includes methods, or subroutines, that can be called by the test code section 210 during runtime to generate annotations for the GUI objects. In the embodiment shown in FIG. 2, the test automation tool 102 includes a method Point_Note 211 to generate a visual cue and a method Point_Audio 212 to play an audio sound clip. The methods 211 and 212, in pseudo code, may have the following format:

Point_Note (object, x_offset, y_offset, comment),
Point_Audio (object, x_offset, y_offset, path_to_audio_file), where "object" is the GUI object being annotated. X_offset and y_offset are the offsets, in number of pixels, between the GUI object and an annotation overlay containing the annotation in the direction of x-axis and y-axis, respectively. "Comment" is the annotation that is going to be displayed in the annotation overlay. The path_to_audio_file shows the complete path to an audio file, which is played when the method Point_Audio 212 is called.

In the example of FIG. 2, the test code section 210 of the test automation tool 102 calls the methods 211 and 212, using the pseudo code:

Point_Note (TO, 50, −20, "THIS EMAIL WILL BE AUTOMATICALLY SENT TO 3 ADDRESSEES"), and
Point_Audio (TO, 50, 50, "/DIR/MAIL1.OGG").

Thus, an GUI object with an object name "TO" will be annotated with comments "THIS EMAIL WILL BE AUTOMATICALLY SENT TO 3 ADDRESSEES" in a first annotation overlay having an offset (50, −20) with respect to the location of the GUI object "TO". A second annotation overlay having an offset (50, 50) will be displayed to show an audio file location /DIR/MAIL1.OGG while the audio file is being automatically played.

In one embodiment, the test automation tool 102 identifies a GUI object by its name (e.g., an HTML link name, or a text box name), an identifier number, and the like. An identifier of the GUI object is then passed to the methods 211 and 212 at runtime to annotate the GUI object. A GUI object may also be identified by its characteristics, using techniques including the domain object model, the xpath, the cascading style sheet (CSS), and the like. Thus, instead of identifying a GUI object by its name (such as "TO"), the methods 211 and 212 may identify a GUI object (a drop down form) using the domain object model dom=document.forms['myForm'].myDropdown. The methods 211 and 212 may also use an XPATH language to identify a GUI object in an Extensible Markup Language (XML) document, which defines a GUI object table containing the GUI objects in the application 135. For example, the GUT object defined in the 4$^{th}$ row and 2$^{nd}$ column of the GUI object table can be identified using xpath=//table[@id='table1']//tr[4]/td[2]. Additionally, the methods 211 and 212 may identify a GUI object defined in the cascading style sheets css=a[href="id3"]. These alternative identifiers can be passed as parameters into the methods 211 and 212. For example, the method Point_Note 211 may be called by:

Point_Note (xpath=//table[@id='table1']//tr[4]/td[2], 50, −20, "THIS NUMBER SHOULD ALWAYS BE POSITIVE").

In one embodiment, some or all of the domain object model, the XML document and the CCS can be stored in the GUI object definition 205 in the application 135. To identify a GUI object, the test automation tool 102 may directly access the GUI object definition 205 in the application 135 or a copy of the GUI object definition 205 stored in a location accessible to the test automation tool 102.

Thus, if an author of the test automation tool 102 wishes to comment on a GUI object, to inform a test engineer of the proper usage of the GUI object, or to illustrate the expected result in a successful test run, the author may programmatically insert code into the test code section 210 of the test automation tool 102 to call methods 211 and 212. Thus, during a test run, the author's comments will pop up on the GUI with a pointer pointing to the GUI object being annotated.

The test automation tool 102 has the distinct feature that the annotation is rendered on the GUI at runtime. Thus, the comments made by an author of the test automation tool 102 can be viewed by a test engineer while a test is being conducted. Also, annotations are coded into the test automation tool 102. Thus, there is no manual editing of the comments after the test automation tool 102 is written, and no risk of losing the valuable insights provided by the author.

Figure 3:
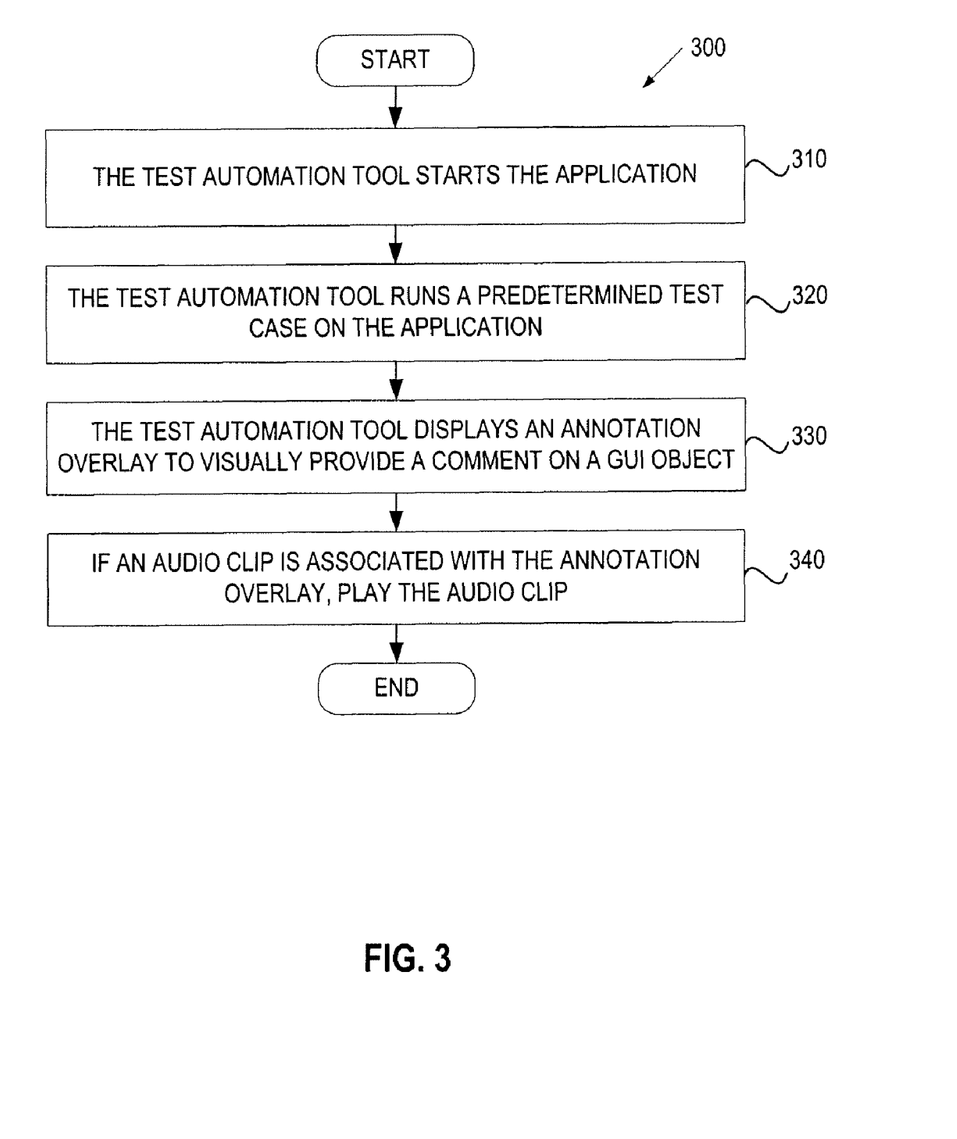
FIG. 3 illustrates a flow diagram of one embodiment of a process for annotating a GUI object of the application.

FIG. 3 illustrate a flow diagram of one embodiment of a process 300 for displaying annotation on a GUI when testing an application. The process 300 may be performed by processing logic 526 of FIG. 5 that may comprise hardware (e.g., circuitry, dedicated logic, programmable logic, microcode, etc.), software (such as instructions run on a processing device), or a combination thereof. In one embodiment, the process 300 is performed by the computing system 101 of FIG. 1 executing the test automation tool 102. In the following description, the process 300 will be explained using the example in FIGS. 4A-4C.

Figure 4A:
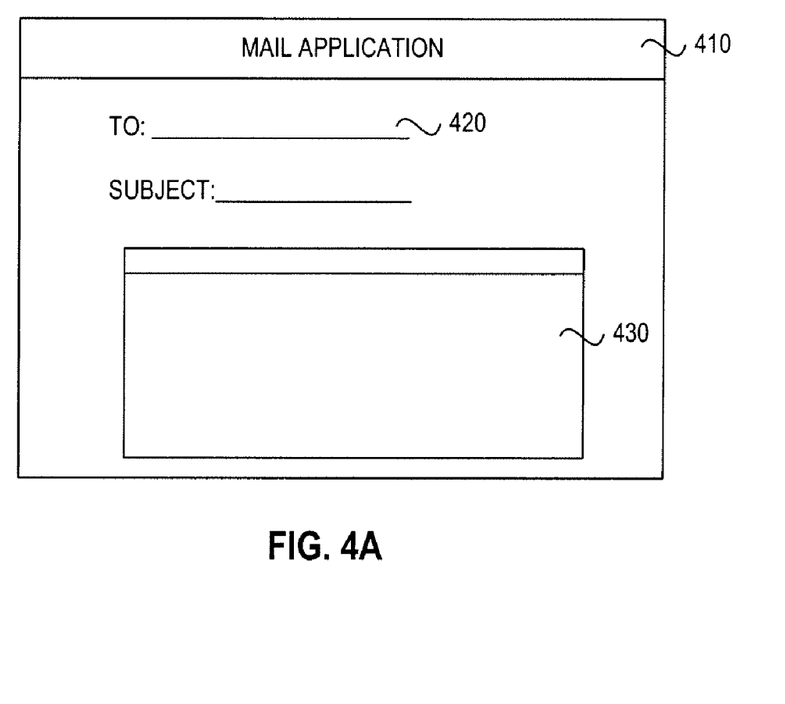
FIGS. 4A-4C illustrate an example of annotating a GUI object of the application

Referring to FIG. 3, at block 310, the process 300 begins with the computing system 101 starting the test automation tool 102, which, in turn, drives an application under test (e.g., a mail application 410 of FIG. 4A). The test automation tool 102 may be launched in response to a request from a user (such as a test engineer), or may be automatically invoked by verification software as part of a design verification process. The test automation tool 102 recognizes the GUI objects of the mail application 410 by referencing a definition (e.g., GUI object definition 205) provided by the application 410. In the example of FIG. 4A, the GUI objects of the mail application 410 include a "TO" field 420 for the addresses of mail recipients and a "BODY" field 430 for message contents.

Proceeding to block 320, the computing system 101 starts to run a predetermined test case on the mail application 410. In one embodiment, the test automation tool 102 is programmed with one or more predetermined test cases that are designed to verify the functions of an application's GUI. In the example of the mail application 410, a predetermined test case may be to send a test message to one or more recipients. This test can be used to verify that the mail application 410 can send email properly, and that the recipients can receive the email properly. The test automation tool 102 may execute code to print text on the screen as an email user would. For example, the pseudo code for printing text into the "TO" field 420 and the "BODY" field 430 may include:

print (BODY, "HELLO"), and
print (TO, "TEST@").

Figure 4B:
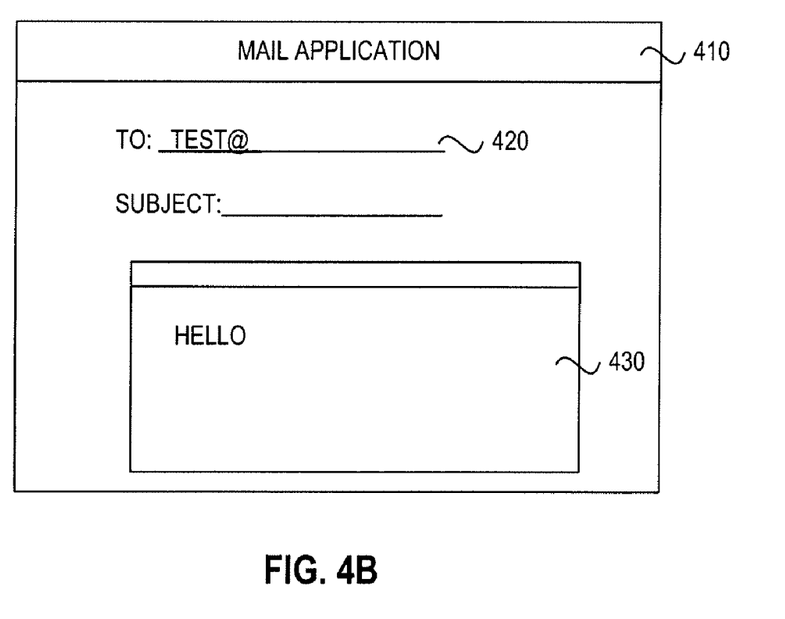
Figure 4C:
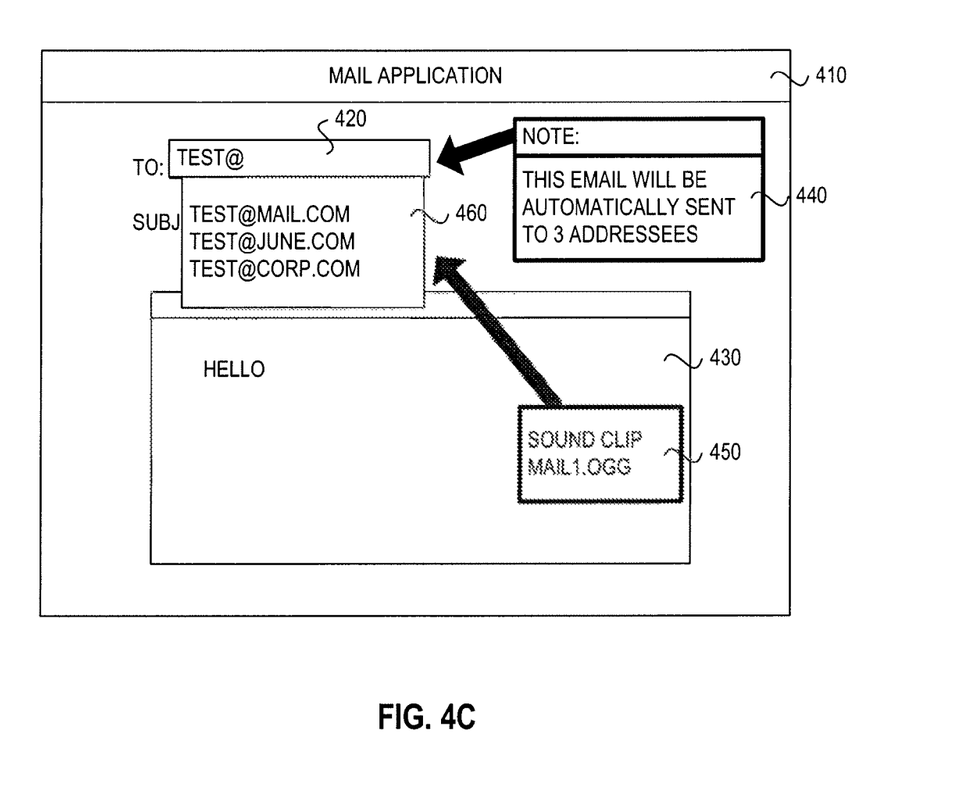

As a result, as shown in FIG. 4B, the test automation tool 102 prints "TEST@" to the field 420 and "HELLO" to the field 430. Referring to FIG. 4C, the TEST@ parameter includes three addressees 460. Proceeding to block 330, while the mail application 410 is engaging in processing the message "HELLO" into an outbound email, the test automation tool 102 displays an annotation overlay 440 to visually provide a comment on the GUI object "TO". The comment may include "THIS EMAIL WILL AUTOMATICALLY BE SENT TO 3 ADDRESSEES," to inform a test engineer that three email accounts should be checked to determine a successful transmission of the email. An example for generating the annotation overlay 440 and the comments is by calling the method Point_Note 211 of FIG. 2. The test automation tool 102 also displays an annotation overlay 450 to show the path to an audio sound clip to be played. An example for generating the annotation overlay 450 and the path is by calling the method Point_Audio 212 of FIG. 2. At block 340, the audio sound clip at the path shown in the annotation overlay 450 is played to provide further information of the GUI object "TO".

In the example of FIG. 4C, each of the annotation overlays 440 and 450 has a pointer (e.g., an arrow) pointing to the GUI object being commented upon. Thus, it is unambiguous as to which GUI object a visual/audio comments is made. In some embodiments, the annotation overlays 440 and 450 may be programmed to have a solid fill-in to cover up a portion of the application in the background (as shown in FIG. 4C), or to have a transparent fill-in so that the texts of the comments can blend into the application in the background.

It is noted that the annotation overlays 440 and 450 may appear to be similar to a conventional screencast with bubble pop-ups. To a test engineer, it appears that the author of the test automation tool 102 describes events with pointers to show what should and should not happen during a test run. However, unlike a conventional screencast in which pop-ups are inserted after the recording of the video, the test automation tool 102 incorporates code to annotate an object and to place an annotation overlay at runtime. In some embodiments, the object being commented upon may be highlighted when a corresponding annotation overlay is displayed or an audio sound clip is played. The user may pause or slow down a test run to have sufficient time to view the annotations.

Figure 5:
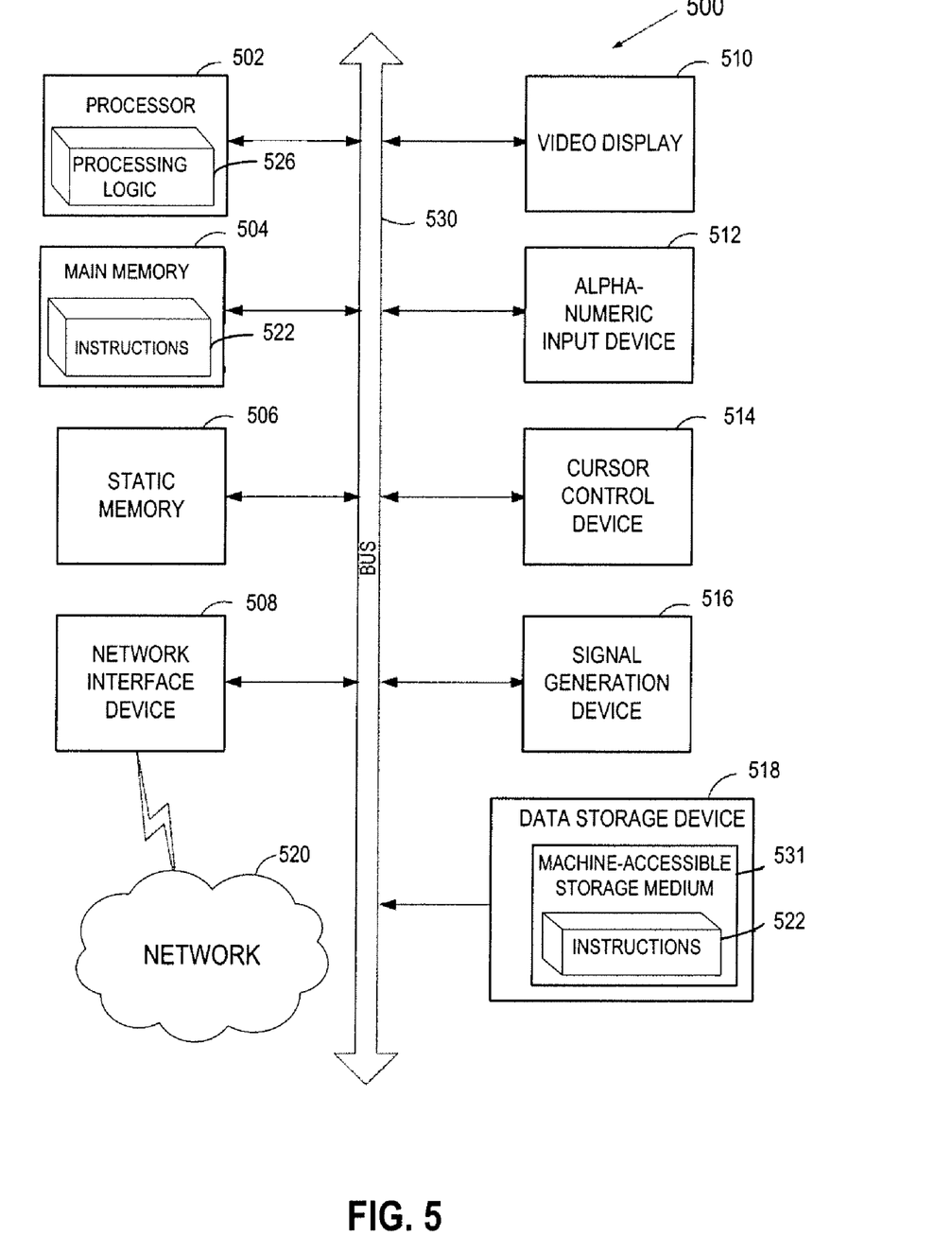
FIG. 5 illustrates a block diagram of an exemplary computer system implementing some embodiments of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a device machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 518 (e.g., a data storage device), which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The secondary memory 518 may include a machine-readable storage medium (or more specifically a computer-readable storage medium) 531 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-readable storage media. The software 522 may further be transmitted or received over a network 520 via the network interface device 508.

The machine-readable storage medium 531 may also be used to store the test automation tool 102 of FIG. 1, and/or the application 135. While the machine-readable storage medium 531 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, a method and system for annotating a GUI object during automated testing of an application have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method comprising:
   testing a graphical user interface (GUI) of an application with a test automation tool; and
   during runtime of the test automation tool, automatically overlaying a visual cue on the GUI, the visual cue pointing to a GUI object of the application and containing a comment regarding an event relating to the GUI object that is expected to occur in runtime, wherein automatically overlaying the visual cue on the GUI further comprises:
   incorporating an annotation method into the test automation tool; and passing information of the GUI object to the annotation method without intervention of a user testing the GUI.

2. The method of claim 1, wherein automatically overlaying the visual cue on the GUI further comprises:
displaying the visual cue during runtime when the test automation tool tests a function relating to the GUI object.

3. A computer-implemented method comprising:
testing a graphical user interface (GUI) of an application with a test automation tool; and
during runtime of the test automation tool, automatically overlaying a visual cue on the GUI, the visual cue pointing to a GUI object of the application and containing a comment regarding an event relating to the GUI object that is expected to occur in runtime, wherein automatically overlaying the visual cue on the GUI further comprises:
automatically playing an audio sound clip relating to the GUI object, the visual cue containing a path to the audio sound clip.

4. The method of claim 3, wherein automatically overlaying the visual cue on the GUI further comprises:
identifying the GUI object with an identifier; and
passing the identifier to an annotation method to annotate the GUI object on the GUI.

5. A computer-implemented method comprising:
testing a graphical user interface (GUI) of an application with a test automation tool; and
during runtime of the test automation tool, automatically overlaying a visual cue on the GUI, the visual cue pointing to a GUI object of the application and containing a comment regarding an event relating to the GUI object that is expected to occur in runtime, wherein the visual cue contains the comment of an author of the test automation tool to inform a user testing the GUI of the vent that is expected to occur in a successful test run.

6. The method of claim 5, wherein the visual cue is displayed as an annotation overlay having a programmable offset from the GUI object.

7. A system comprising:
data storage to store a test automation tool and an application;
a display to display a graphical user interface (GUI) of the application;
a computing entity coupled to the data storage and the display, the computing entity to test the GUI with the test automation tool and, during runtime, to automatically annotate a GUI object of the application with an annotation overlay that points to the GUI object, the annotation overlay to contain a comment regarding an event relating to the GUI object that is expected to occur in runtime; and
a audio signal generating device to play an audio sound clip identified by the annotation overlay that points to the GUI object.

8. A system comprising:
data storage to store a test automation tool and an application;
a display to display a graphical user interface (GUI) of the application;
a computing entity coupled to the data storage and the display, the computing entity to test the GUI with the test automation tool and, during runtime, to automatically annotate a GUI object of the application with an annotation overlay that points to the GUI object, the annotation overlay to contain a comment regarding an event relating to the GUI object that is expected to occur in runtime, wherein the computing entity is to execute an annotation method at runtime to display a comment regarding the GUI object.

9. The system of claim 8, wherein the application is a Web application or a mail application.

10. The system of claim 8, wherein the GUI object includes a button, a link, or a text box displayed on the GUI.

11. A computer readable storage medium including instructions that, when executed by a processing system, cause the processing system to perform a method comprising:
testing a graphical user interface (GUI) of an application with a test automation tool;
during runtime of the test automation tool, automatically overlaying a visual cue on the GUI, the visual cue pointing to a GUI object of the application and containing a comment regarding an event relating to the GUI object that is expected to occur in runtime;
identifying the GUI object by addressing an entry of a table in an Extensible Markup Language (XML) document using an XPATH language, the table containing definition of the GUI object; and
passing the entry of the table to an annotation method to annotate the GUI object at runtime.

12. A computer readable storage medium including instructions that, when executed by a processing system, cause the processing system to perform a method comprising:
testing a graphical user interface (GUI) of an application with a test automation tool;
during runtime of the test automation tool, automatically overlaying a visual cue on the GUI, the visual cue pointing to a GUI object of the application and containing a comment regarding an event relating to the GUI object that is expected to occur in runtime; and
identifying the GUI object to annotate at runtime by passing an identifier in a cascading style sheet to an annotation method.

13. A computer readable storage medium including instructions that, when executed by a processing system, cause the processing system to perform a method comprising:
testing a graphical user interface (GUI) of an application with a test automation tool;
during runtime of the test automation tool, automatically overlaying a visual cue on the GUI, the visual cue pointing to a GUI object of the application and containing a comment regarding an event relating to the GUI object that is expected to occur in runtime; and
identifying the GUI object to annotate at runtime by passing an identifier in a domain object model to an annotation method.

14. A computer readable storage medium including instructions that, when executed by a processing system, cause the processing system to perform a method comprising:
testing a graphical user interface (GUI) of an application with a test automation tool;
during runtime of the test automation tool, automatically overlaying a visual cue on the GUI, the visual cue pointing to a GUI object of the application and containing a comment regarding an event relating to the GUI object that is expected to occur in runtime; and
identifying the GUI object to annotate at runtime by passing a name of the GUI object to an annotation method.

15. A computer readable storage medium including instructions that, when executed by a processing system, cause the processing system to perform a method comprising:

testing a graphical user interface (GUI) of an application with a test automation tool;

during runtime of the test automation tool, automatically overlaying a visual cue on the GUI, the visual cue pointing to a GUI object of the application and containing a comment regarding an event relating to the GUI object that is expected to occur in runtime, wherein the visual cue contains the comment of an author of the test automation tool to inform a user testing the GUI of the event that is expected to occur in a successful test run.

16. The computer readable medium of claim 15, wherein automatically overlaying a visual cue on the GUI further comprises:

automatically playing an audio sound clip relating to the GUI object, the visual cue containing a path to the audio sound clip.

17. The computer readable medium of claim 15, wherein the method further comprises:

displaying the visual cue as an annotation overlay that has a programmable offset from the GUI object.

* * * * *